United States Patent
De Araujo (10) Patent No.: US 11,313,179 B2
(45) Date of Patent: Apr. 26, 2022

(54) SYSTEM FOR CONNECTING BETWEEN RISERS OF COMPOSITE MATERIAL AND FLOWLINES, WHICH CAN BE USED WITH A HYBRID RISER, AND METHOD FOR CONSTRUCTING SAME

(71) Applicant: ODEBRECHT OLEO E GAS S.A., Rio de Janeiro (BR)

(72) Inventor: Rafael Machado Guigon De Araujo, Rio de Janeiro (BR)

(73) Assignee: Odebrecht Oleo E Gas S.A., Rio De Janeiro (BR)

( * ) Notice: Subject to any disclaimer, the term of this patent is extended or adjusted under 35 U.S.C. 154(b) by 0 days.

(21) Appl. No.: 17/041,867

(22) PCT Filed: Mar. 26, 2018

(86) PCT No.: PCT/BR2018/050081
§ 371 (c)(1),
(2) Date: Sep. 25, 2020

(87) PCT Pub. No.: WO2019/183692
PCT Pub. Date: Oct. 3, 2019

(65) Prior Publication Data
US 2021/0131193 A1    May 6, 2021

(51) Int. Cl.
*E21B 17/01* (2006.01)
*F16L 1/15* (2006.01)
(Continued)

(52) U.S. Cl.
CPC .......... *E21B 17/015* (2013.01); *E21B 17/012* (2013.01); *F16L 1/15* (2013.01);
(Continued)

(58) Field of Classification Search
CPC .. E21B 17/015; E21B 17/017; E21B 43/0107; F16L 1/15; F16L 1/26
See application file for complete search history.

(56) References Cited

U.S. PATENT DOCUMENTS 6,082,391 A    7/2000  Thiebaud et al.
6,321,844 B1 *  11/2001  Thiebaud ................ B63B 21/27
                                          137/236.1
(Continued)

FOREIGN PATENT DOCUMENTS

CA    2454407    * 10/2010
FR    2821143 A1    8/2002
GB    2468653 A     9/2010

OTHER PUBLICATIONS

ISR from Application No. PCT/BR2018/050081 dated Sep. 18, 2018.

*Primary Examiner* — Sean D Andrish
(74) *Attorney, Agent, or Firm* — Hahn Loeser & Parks LLP; Bret A. Hrivnak (57) ABSTRACT

This invention relates to oil and gas exploration and comprises a direct connection system referred to as a Lower Riser Termination Assembly (LRTA), between risers made of composite material and horizontal lines installed on the seabed (flowlines). The system is applicable to a hybrid riser and its construction method allows cost reduction and system assembly/installation time optimization. The LRTA connection system is applicable to both rigid and flexible flowlines without need for any intermediate connection section/equipment between these and the risers. The construction of the system allows free vertical expansion of the risers along the entire structure. In addition, in the construction method developed for this system, the required area is significantly reduced.

8 Claims, 11 Drawing Sheets

(51) Int. Cl.
    *E21B 43/01*          (2006.01)
    *F16L 1/26*           (2006.01)
(52) U.S. Cl.
    CPC ......... *E21B 17/017* (2013.01); *E21B 43/0107*
                        (2013.01); *F16L 1/26* (2013.01)

(56) References Cited

U.S. PATENT DOCUMENTS

| | | |
|---|---|---|
| 6,612,370 B1 | 9/2003 | Jahnsen et al. |
| 6,837,311 B1 | 1/2005 | Sele et al. |
| 6,869,253 B2 | 3/2005 | Biolley |
| 7,025,535 B2 | 4/2006 | Chiesa et al. |
| 8,267,179 B2 | 9/2012 | Butcher et al. |
| 9,115,543 B2 * | 8/2015 | Pionetti ................ E21B 43/013 |
| 2002/0060077 A1 | 5/2002 | Biolley |
| 2004/0156684 A1 | 8/2004 | Pionetti |
| 2005/0271476 A1 | 12/2005 | Chiesa et al. |
| 2006/0177276 A1 | 8/2006 | Stassen et al. |
| 2010/0186963 A1 | 7/2010 | Butcher et al. |
| 2011/0042094 A1 | 2/2011 | Pionetti |
| 2012/0230770 A1 | 9/2012 | Sintini et al. |
| 2015/0047852 A1 | 2/2015 | Pionetti |
| 2017/0074426 A1 | 3/2017 | Luppi et al. |

* cited by examiner

SYSTEM FOR CONNECTING BETWEEN RISERS OF COMPOSITE MATERIAL AND FLOWLINES, WHICH CAN BE USED WITH A HYBRID RISER, AND METHOD FOR CONSTRUCTING SAME

TECHNICAL SECTOR TO WHICH THE INVENTION REFERS TO

This invention applies to the technical field of oil and gas exploration, being represented by a direct connection system between risers made of composite material and horizontal lines installed on the seabed (flowlines), referred to as LRTA (Lower Riser Termination Assembly). The developed system is applicable to hybrid riser and its construction method allows, among other things, the reduction of costs and the optimization of the system assembly/installation time. The disclosed LRTA connection system shows as one of its main advantages being applicable to both rigid and flexible flowlines with no need for any intermediate connection section/equipment between these and the risers.

STATE OF THE ART

In marine production systems, the oil produced in the wells located at the bottom of the ocean is transported to a stationary production unit (UEP) by means of pipelines. This set of pipelines is formed by injection and collection lines and conventionally called production system lines.

This set of pipelines comprising the production lines, is basically split into two distinct portions:
  The first portion, which is predominantly horizontal, named "horizontal section" is static and known specifically in technical jargon as flowline;
  The second part consists of a predominantly vertical pipeline connected to the horizontal section end and rises from the seabed is called the vertical section and is known by its technical jargon: riser.
  Specifically, on vertical pipelines called risers, this patent applies to the Hybrid Riser Tower for deep and ultra-deep water, as described, for example, in U.S. Pat. No. 6,082,391 (Stolt/Doris). Hybrid Riser Towers are comprised by a rigid riser grouping (steel) provided with floats anchored to the bottom of the sea and tensioned by means of a flotation tank. The system is connected to the UEP through flexible jumpers and connected to rigid pipelines installed on the seabed. Such systems were built and installed, for example, in Girassol, Greater Plutonio and CLOV fields in West Africa.

From the field experience, the high manufacturing cost of this system has been demonstrated due, among other factors, to the large number of components required, building site size, transport cost and structure lifting.

Given this scenario, it was concluded that conventional steel pipes for transportation of fluids make the hybrid riser very heavy, making buoyancy a great challenge. Thus, the concept of Hybrid Riser made of composite material has emerged, as described in U.S. Pat. No. 6,612,370 (Composite Hybrid Riser). The use of composite material for the construction of Hybrid Riser Towers has added, among other things, weight reduction to the structure, since the components made from composite materials weigh only a fraction of the steel components. As a result of the weight saving, the buoyancy and basic work requirements have been reduced.

With the matter of optimized weight from the use of composite materials in Hybrid Riser Towers, the demand has fallen on the need for structural simplifications of the risers×flowlines connection system, very complex in the structures hitherto known and installed.

Proposals for simplifications in the connection system between risers and flowlines are described in the documents U.S. Pat. No. 6,837,311 (B1)—Hybrid Riser Configuration; U.S. Pat. No. 7,025,535 (B2)—Seafloor/surface connecting installation for a submarine pipeline which is connected to a riser by means of at least one elbow pipe element that is supported by a base; U.S. Pat. No. 6,869,253 (B2)—Hybrid Riser or pipe for fluid transfer; U.S. Pat. No. 8,267,179 (B2)—Connection tool with indexing system; US20150047852 (A1)—Installation comprising seabed-to-surface connections of the multi-riser hybrid tower type, including positive-buoyancy flexible pipes; US 2017/0074426—Method for connecting a bottom pipe and riser pipe.

The U.S. Pat. No. 6,837,311 (B1) and U.S. Pat. No. 7,025,535 (B2) show a Hybrid Riser having a base structure connected to its bottom housing the intermediate risers/flowlines and their respective connectors. Such patents reveal advances in the connection system between risers and flowlines, eliminating efforts due to the of the hybrid riser tower movement, but they do not remove the need for risers and flowlines.

The U.S. Pat. No. 6,869,253 (B2) shows another connection proposal between risers and flowlines, seeking to simplify and decrease the number of system components. In that proposal the lower end of the rigid riser or of the rigid riser set is anchored to a drive line named "tendon". The connection to the rigid flowline is made by a flexible intermediate section and two connectors. In this patent application, the shown LRTA connection system eliminates the need for an intermediate section and additional connectors, simplifying the Hybrid Riser structure.

The U.S. Pat. No. 8,267,179 (B2) shows the connector used for the connection between riser and flexible jumper as a recoverable tool after the connection. The main technical advance driven by the LRTA connection system is that, besides the direct connection, the system features riser guides made of composite material and a bending limiting structure of the risers, which guarantees the direct connection operation with no need for any intermediate section/equipment.

The document US20150047852 (A1) shows a Hybrid Riser system similar to that presented in U.S. Pat. No. 6,082,391 (Stolt/Doris) by modifying the risers connection with flowlines and proposing that such a connection be made with a flexible jumper. Again, there is a need for intermediate connection sections between risers and flowlines, which, in the system proposed in this patent application becomes unnecessary.

The document US2017/0074426 (A1) reveals a riser to flowline connecting method that includes a direct connection connector and devices to limit the flexible pipeline bending. This connection method shows a simplification with regard to the state of the art, as it allows a direct connection between risers and flowlines for cases where the flowline is flexible. However, for rigid flowlines such a direct connection is not possible, and the presence of an intermediate connection section is required. For this reason, the relevant technical advance of the LRTA connection system in this patent application is that the direct connection is made independently of the flowline material. Thus, the connection between risers and flowlines is made directly for both rigid and flexible flowlines, and no intermediate part/equipment is required.

Another aspect addressed in this patent application concerns the innovative construction method developed for the proposed system. The state-of-the-art construction methods must overcome some disadvantages, such as, for example, the need for significantly large construction sites to accommodate the structures during and after assembly. In short, the main disadvantages presented by the state-of-the-art methods and which are overcome by the construction method proposed here are:

Requirement of work site with a minimum length, in a straight line to the coast, of 2 km;

Very long construction time.

Thus, and in order to overcome the problems/limitations of the known state of the art, an innovative connection system was developed between risers made of composite material and flowlines, applicable to the hybrid riser, which in addition to presenting advantages in terms of cost reduction, in the components number and the structure weight, its construction method also shows a great advance against the known methods. The novelty and technical effect of such system also lies in its simplicity in relation to the state of the art.

GOALS AND BRIEF DESCRIPTION OF THE INVENTION

As explained above, the state-of-the-art connection systems must overcome limitations (existing technical problems) such as, for example: the dependence of equipment/intermediate connection parts between flowlines and risers, increasing the costs and assembly time, limitations as to the flowlines' (rigid or flexible) material, a large area is required for the system to be assembled, overall system weight, among other things. Thus, the developed system has as main goals and advantages:

To eliminate the need for intermediate equipment/sections between composite material risers and rigid or flexible flowlines;

To allow direct connection between risers made of composite material and rigid or flexible flowlines;

To reduce the system assembly time and cost

To reduce the total system weight as a whole, making the installation process easier To significantly reduce the ground area required for the system assembly The present LRTA Risers and Flowlines Connection System is basically comprised of Rigid pipeline core Risers made of composite material Guides for the risers, connected to the rigid pipeline core Riser bending limiting structure, connected to the rigid pipeline core (Rigid or flexible) flowlines Direct connection connectors between risers and flowlines Generally speaking, the rigid pipeline core is a structural component of the Hybrid Riser, providing support for all of its components. The risers made of composite material, along with a rigid pipeline core form a set of risers, known technically as a "bundle." The riser guides, made of polymeric material, are connected to the rigid pipeline core by means of clamps incorporated in the guide structure, the function of which is to guarantee the risers position in relation to the rigid pipeline core. In addition to transferring the lateral forces of the risers (due to current drag force and possible vibrations) to the core, the guides also have the purpose of ensuring the axial displacement of the risers, thus avoiding that buckling occurs. The bending limiting structure of the risers is a metallic structure having compartments that guide risers in the flowlines' direction avoiding the interferences between risers and keeping their curvature within the bending limits informed by the riser pipe supplier, being connected to the rigid pipeline core. Finally, the direct connection connectors are devices that allow the connection of composite material risers to the flowlines, which, in the concerned system, can be both rigid and flexible.

The direct connection between composite material risers and flowlines is one of the major technological advances provided by the system shown here, since in the current state of the art, the connections between risers and flowlines are made using intermediate transfer equipment, such as spools or jumpers.

In the presented system, the direct connection is possible mainly by the association of three factors: the risers are made of composite material, allowing the structure to bend; the use of the riser bending limiter; and the proper sizing of the limiter position and the direct connection connector position with respect to the seabed. The bending limiters are sized according to the bending limit provided by the riser manufacturers.

Another important feature of the disclosed system is the fact that its construction allows free vertical expansion of the risers along the entire structure, even in the bending limiter area, since it works as a guide, and there are therefore no risers×limiter fastening/restriction points.

In addition to the advantages and technological advances achieved with that connection system, its construction method is also innovative compared to those known in the state of the art. While, in the state of the art, the conventional methods require a large assembly and construction area, with a minimum extension, in a straight line to the coast, of 2 km, in the construction method developed for the present system, the required area is significantly reduced, by approximately 6000 m2, with extension, in a straight line to the coast, of 200 m, that is, 10 times less than the length required for the known construction methods.

For the construction of this system, the building site is comprised of: bundle production line with welding and inspection stations of the welds that are carried out on the rigid pipeline core; welding joint lining station; tensioner; riser guide assembly stations; coils of risers made of composite material; offshore launch ramp; and component storage area. In short, the construction is carried out as follows:

1. Welding, inspection and eventual repair of the first section of the rigid pipeline core. The rigid pipeline core is formed by the welding of 12 m pipes;

2. Welding joint lining;

3. Once the first section of the rigid pipeline core is welded, with the lining being applied to the joint, that section passes through the tensioner and is pulled towards the offshore launch ramp (with the aid of a tug boat) allowing the next pipe integrating the rigid pipeline core to enter the welding and lining area, gradually forming the structure of this core. This is done until the entire pipeline core is assembled;

4. The installation station of the riser guides is located after the tensioner. Thus, every time a section of the rigid pipe core under construction goes by the tensioner, it receives in its structure the internal parts of the riser guides, mounted in the riser guide assembly station;

5. When the rigid pipeline core length reaches the offshore launch ramp, the core construction is interrupted for assembly of the riser connection system and flowlines—LRTA. Such a system is prefabricated, consisting of part of the rigid pipeline core, internal parts of the riser guides and part of the riser bending limiting structure, which, at this moment, still has no tubular closing members. The outer parts of the guides and the tubular closing members will only be installed after the composite risers' assembly.

6. Once the LRTA connection system is assembled, the construction of the rigid pipeline core is restarted;

7. As the rigid pipeline core is assembled and the internal parts of the riser guides are installed, the risers made of composite material are positioned and the outer part of the riser guides as well as the tubular closing members of the bending limiting structure, are installed;

8. This in-line assembly process continues, repeating the steps until the complete assembly of the system.

It is worth mentioning that the smaller assembly area is possible due to the joint action of the tug boat with the production line, allowing the system to be progressively pulled towards the offshore launching ramp as it is assembled. Such a procedure avoids the need for a large amount of ground storage space for the structure during its assembly and thereafter.

DESCRIPTION OF FIGURES

FIG. 01—Hybrid Composite Riser general arrangement
FIG. 02A—First extreme hybrid riser position
FIG. 02B—Second extreme hybrid riser position
FIG. 03—Connection system between risers and flowlines—state of the art
FIG. 04—Connection system between risers and flowlines—developed system
FIG. 05A—Side view of the bending limiting structure
FIG. 05B—Upper view of the bending limiting structure
FIG. 06A—Side view of the guide for directing composite risers
FIG. 06B—Front view of the guide for directing composite risers
FIG. 06C—Detailed view of the guide for directing composite risers
FIG. 07—Building site layout

DETAILED INVENTION DESCRIPTION

Figure 03:
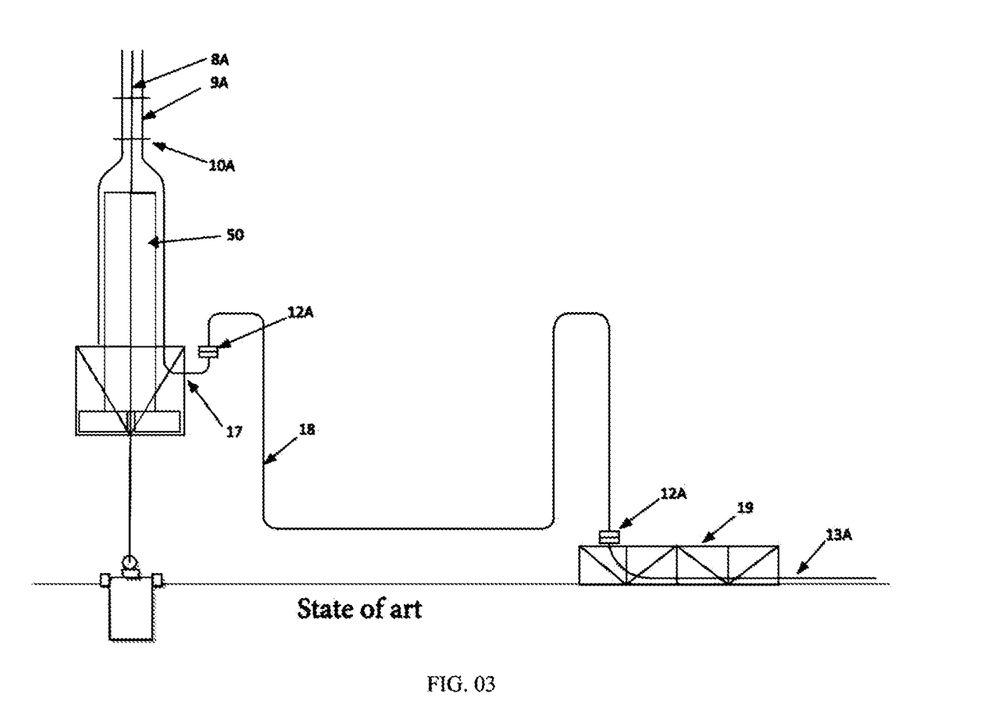
Figure 04:
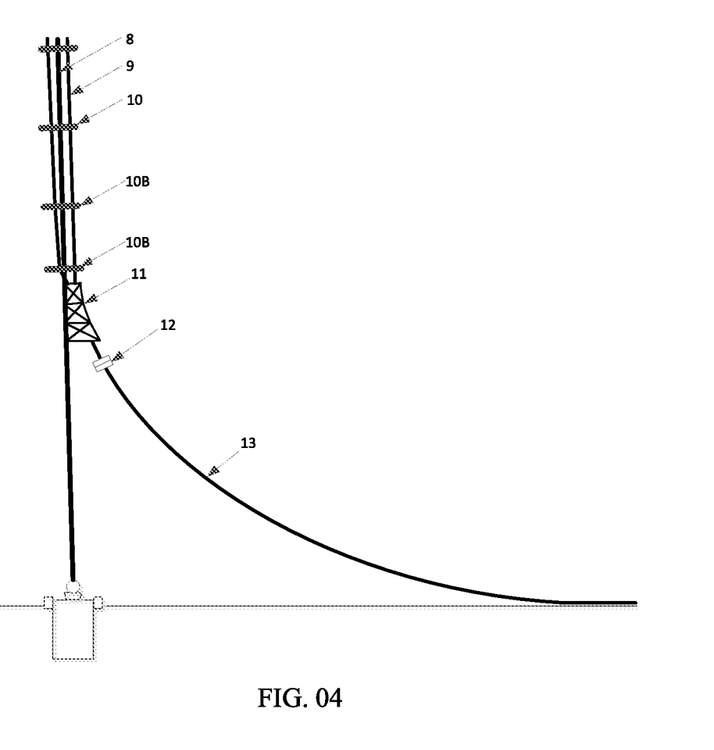

For a better understanding of the advantages of this invention in relation to the state of the art, a comparison between the components necessary for the state-of-the-art systems is presented below (FIG. 03) and the components required for the system shown herein (FIG. 04).

TABLE 1

| Comparison between state-of-the-art systems and the developed system | |
| --- | --- |
| State of the art (FIG. 03) | Developed System (FIG. 04) |
| Rigid pipeline core (8A) | Rigid pipeline core (8) |
| Rigid Risers (9A) | Risers made of composite material (9) |
| Riser (9A) guides (10A) (connected to the rigid pipeline core (8A)) | Riser (9) guides (10) (connected to the rigid pipeline core (8)) |
| Guides for vertical rigid riser expansion (17) with a float (50) anchored to the seabed | Bending limiting structure of the risers (11), connected to the rigid pipeline core (8) |
| Rigid flowlines (13A) | Rigid flowlines **(13) |
| Intermediate connection section/equipment (18) between risers (9A) and flowlines (13A): | Guides (10B) and Direct connection connectors (12) between risers (9) and flowlines (13) |
| Flexible Jumpers or rigid spools | |

TABLE 1-continued

| Comparison between state-of-the-art systems and the developed system | |
| --- | --- |
| State of the art (FIG. 03) | Developed System (FIG. 04) |
| Vertical connectors (12A) between risers (9A) and intermediate connection piece/equipment (18) | |
| Submarine pipeline termination equipment (PLET) (19) | |
| Vertical connectors (12A) between intermediate connection section/equipment (18) and PLET (19) | |

**or flexibles

From Table 1 we can clearly see the advantages of the proposed system, especially with regard to the significant decrease in the number of components required to operate the system.

Figure 01:
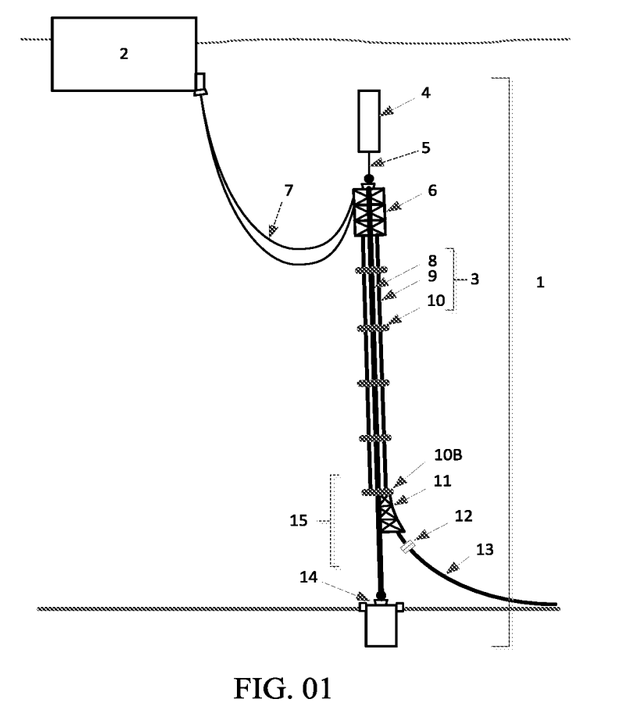

FIG. 01 shows a Hybrid Riser system (1) made of composite material, consisting of a vertical section, named bundle (3), pulled by a float (4) at its upper end (6), the thrust of which provides stability to the system. The connection between the float (4) and the upper end (6) of the bundle (3) is made by a tether (5). The upper end (6) also, provides an anchoring point for the composite risers (9) as well as a connection between the flexible jumpers (7) and the composite risers (9) of the bundle (3). The flexible jumpers (7) are connected to the stationary production unit (UEP) (2), ensuring that only part of the dynamic load is transferred to the Hybrid Riser system (1).

The bundle (3) is composed by: a rigid pipeline core (8)—structural component, manufactured with steel pipe with 18-30 inch nominal diameter, which transfers the sustaining force produced by the float (4) to the anchor (14); by composite risers (9) with 3-14 inch nominal diameter; and guides (10) for the risers (9). Due to the submerged weight of composite risers (9), the bundle (3) has no need for additional floats.

The LRTA Connection System (15) between composite risers (9) and flowlines (13), object of this invention is located at the lower end of the bundle (3). Such a system (15) is comprised of: guides (10B) that direct the composite risers (9) to the final connection position with the flowlines (13); bending limiting structure (11) for the risers (9); and direct connection connectors (12) between risers (9) and flowlines (13). The direct connection connectors (12) have an alignment system between the connector part located on the composite riser (9) and the connector part located on the flowline (13). This system allows an alignment at any position of the connecting axis, that is, it is an alignment system working independently of the position of the parts to be connected. Such a system can be incorporated into the parts of the connector (12) or into a recoverable tool, or also into both.

Figure 02A:
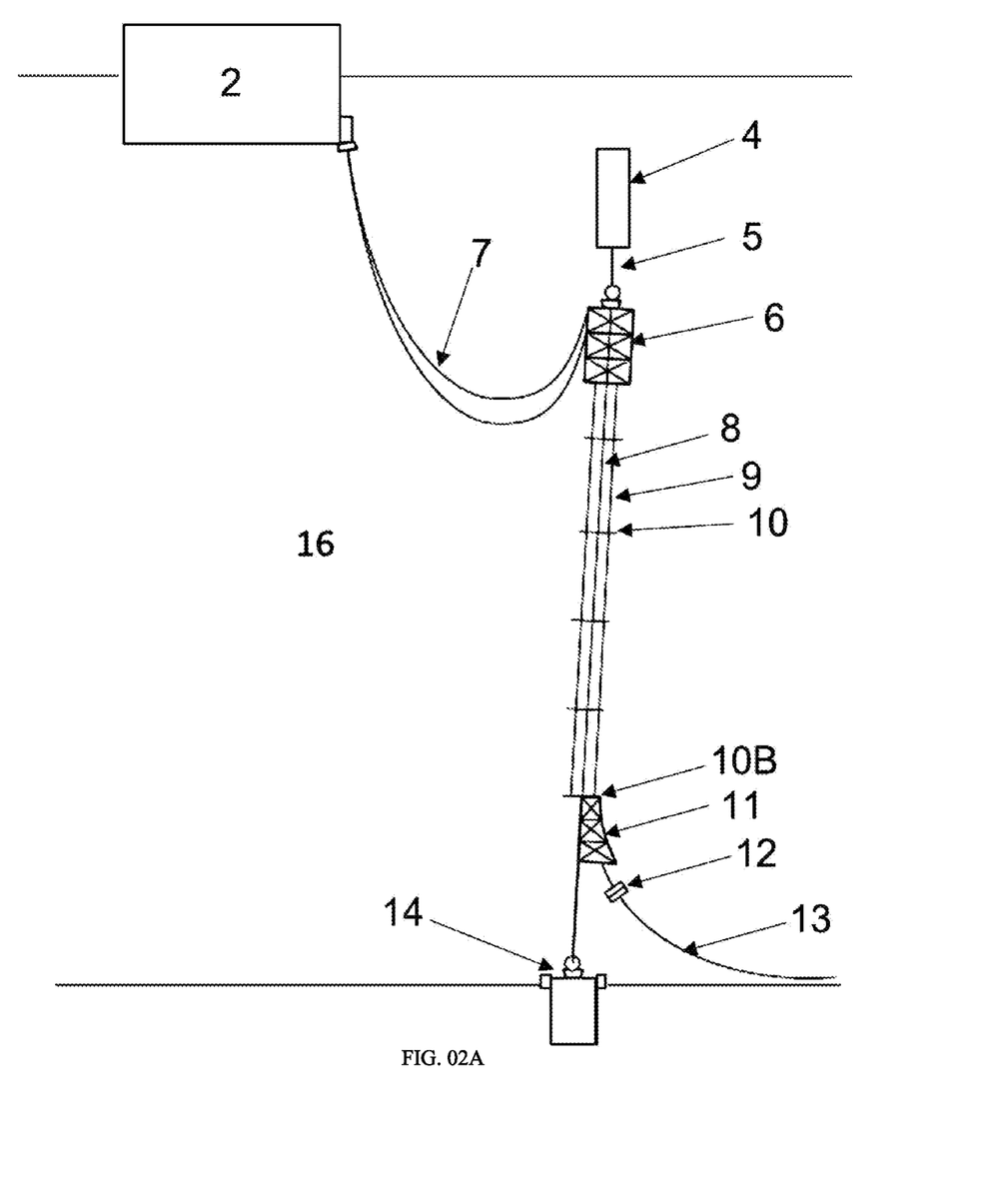
Figure 02B:
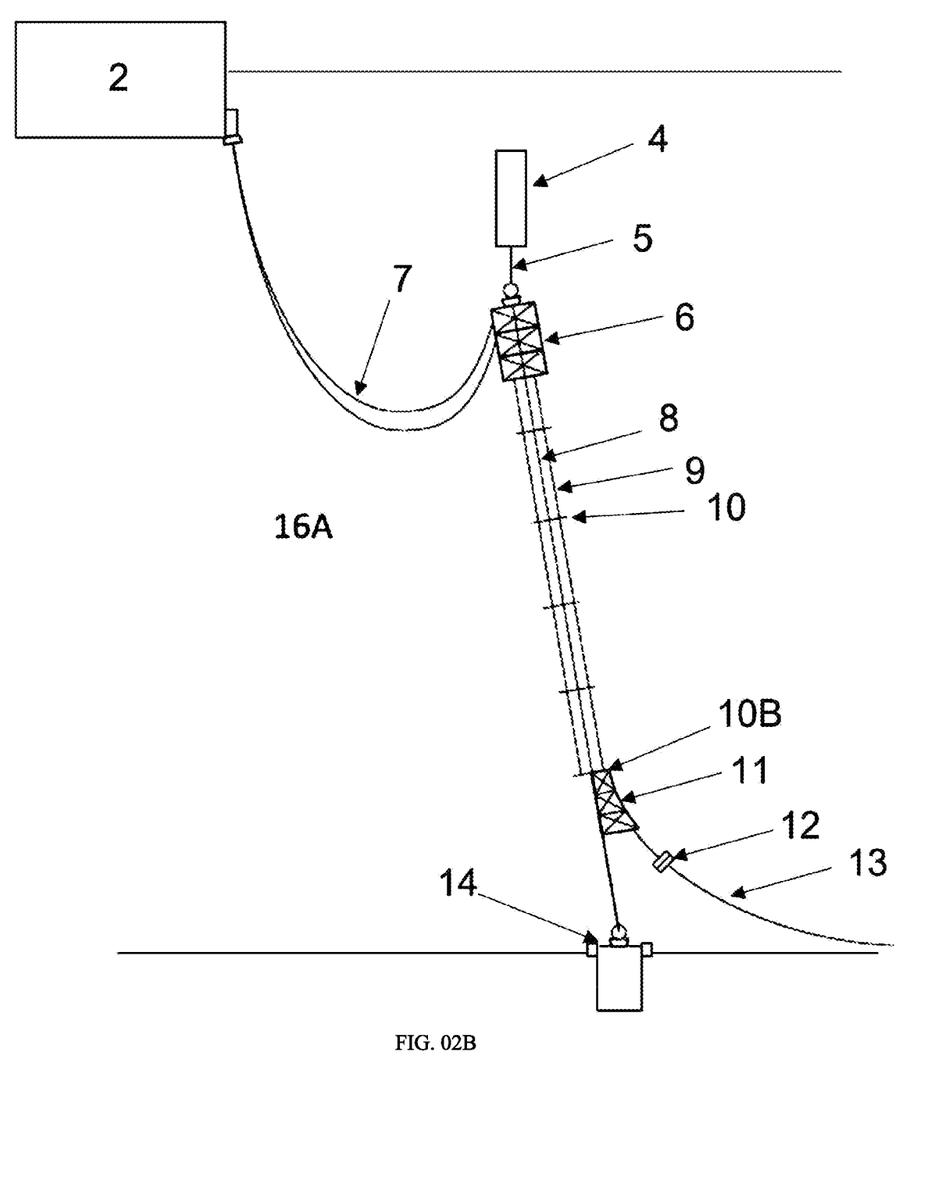

The Hybrid Riser system (1) design should establish: the assembly position of the bending limiting structure (11) in relation to the seabed; its length; and the direct connection connector position (12) between the composite risers (9) and the flowline (13). Such parameters depend on the flowline resistance (13) and the extreme positions (16) and (16A) of the Hybrid Riser system (1) considering movement of the UEP (2) and the current, as represented in FIGS. 02A and 02B.

Figure 05A:
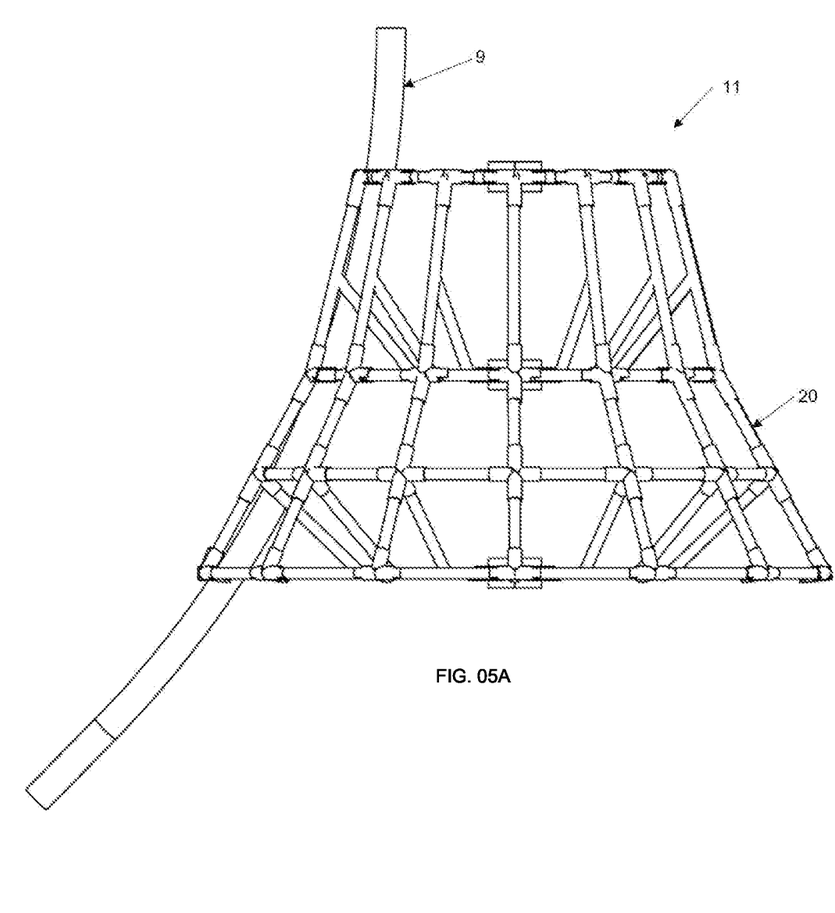
Figure 05B:
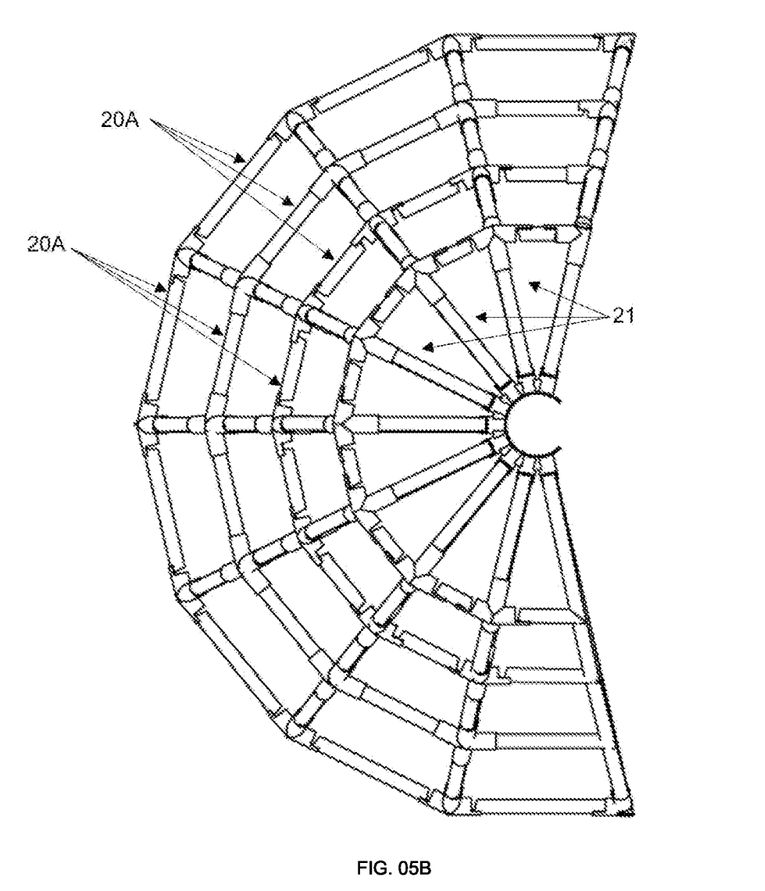

FIGS. 05A and 05B show the bending limiting structure (11) which can be manufactured, for example, from tubular steel members. The bending limiting structure (11) is comprised of tubular feed-through members (20) through which the risers (9), and tubular closing members (20A) pass, which establish the bending limit of the risers (9). The bending limiting structure (11) has compartments (21) that direct the composite risers (9) with the help of guides (10B), for the proper position of connection with the flowlines (13), thus avoiding interference. The tubular closing members (20A) form a bend to limit the bending of the composite risers (9), and are installed after the composite risers' (9) assembly. The radius of that bend should be greater than the minimum bending radius informed by the riser pipe manufacturer (9), which typically ranges from 4 to 20 m. The arch length of the bending limiting structure (11) limiting the riser (9) bending should correspond to an angle from 15 to 60 degrees.

Figure 06A:
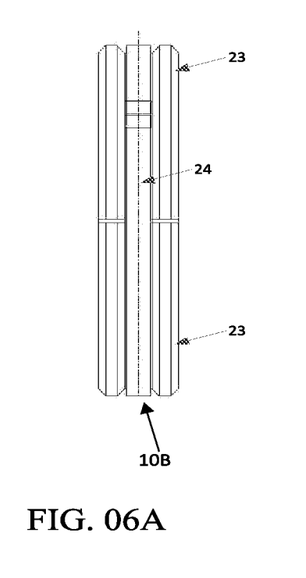
Figure 06B:
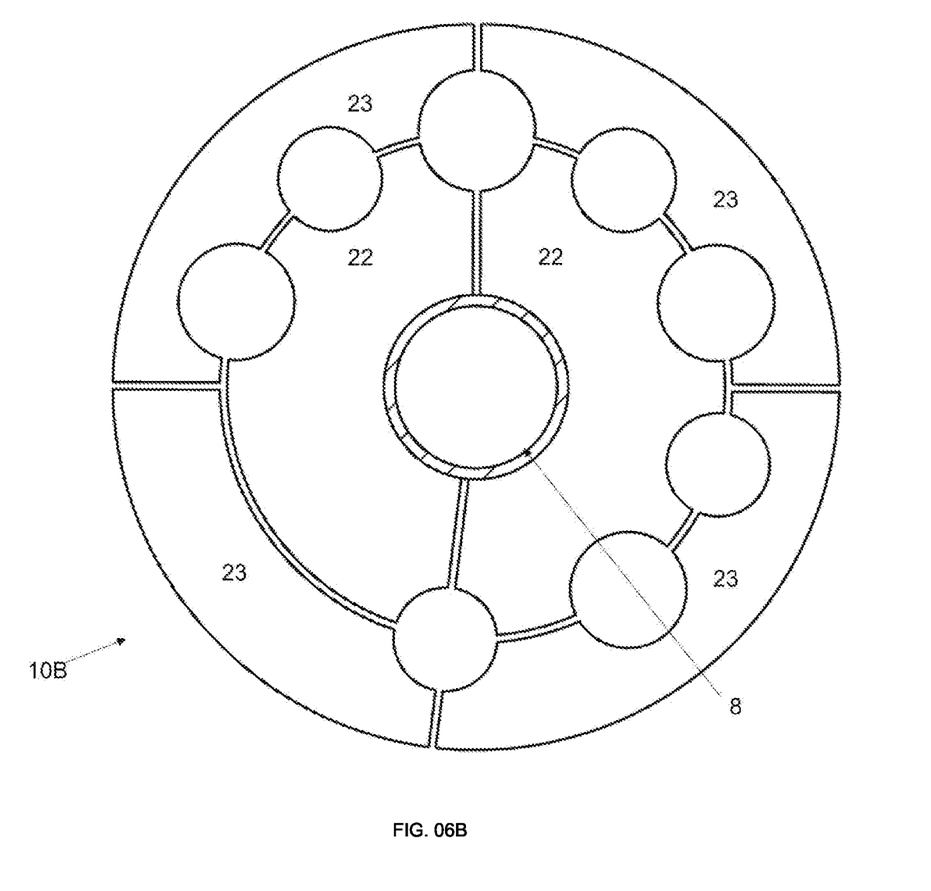
Figure 06C:
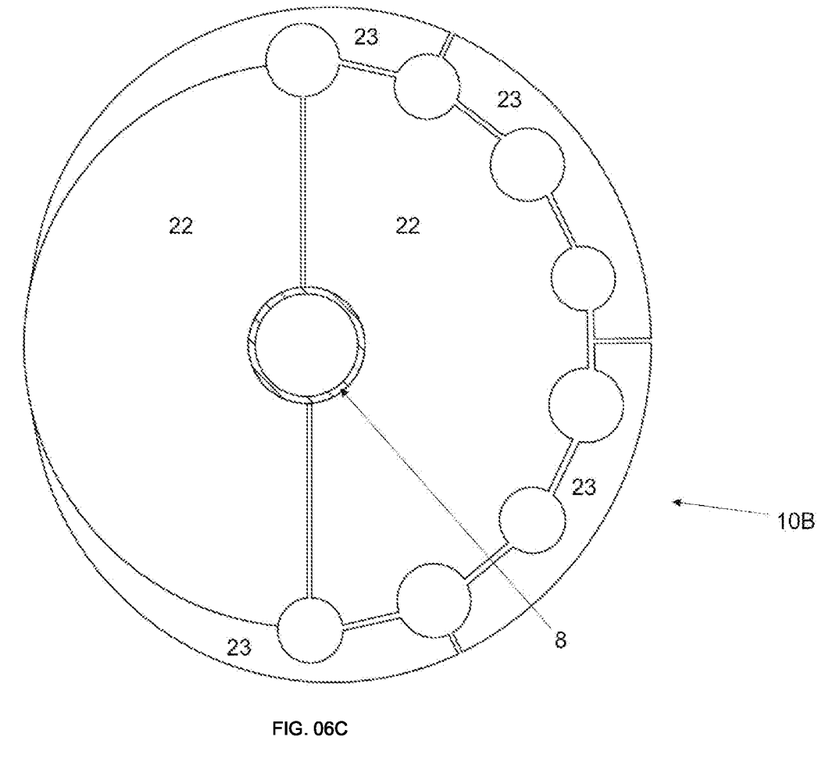

FIGS. 06A, 06B and 06C show the composite risers (9) directing guides (10B) toward the compartments (21) of the bending limiting structure (11). The directing guides (10B), as well as all the other guides (10) of the bundle (3), are comprised of internal parts (22) and outer parts (23) manufactured, for example, in polymeric material. All parts (22) and (23) are fastened to the rigid pipeline core (8) by means of a compression tape (24) manufactured of a resistant material, such as, for example, Kevlar.

Figure 07:
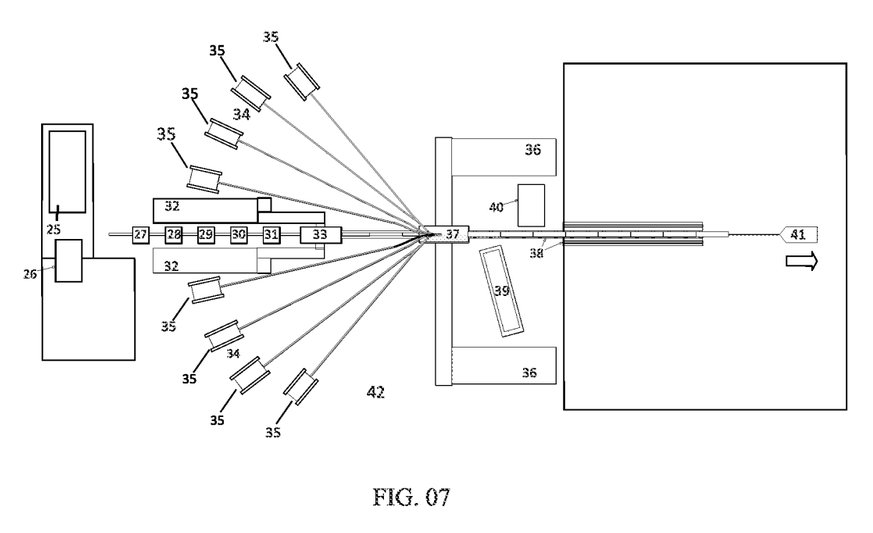

FIG. 07 shows the building site (42) floor plan of the proposed system, being comprised of: a pipe storage area (25) for the rigid pipeline core assembly (8); a mobile crane (26), a welding station (27), a welding inspection station (28), a weld repair station (29), a welding joint lining station (30), a tensioner (31), a storage area for the riser guide internal parts (32), a riser guide internal parts assembly station (33), a positioning area (34) for the riser (9) coils (35), a storage area for the riser guide outer parts (36), a riser guide outer parts assembly station (37), an offshore launching ramp (38), a storage area (39) of the connection system between LRTA risers and flowlines (15), a crane (40) and a tug boat (41).

The Hybrid Riser system (1) construction, provided with the LRTA connection system (15) shown herein, is initiated by the assembly of the rigid pipeline core (8), which is comprised by the welding of 12 m long standard pipes. Thus, after welding (station 27), inspection (station 28), possible repair (station 29) and weld joint lining (station 30) of the first rigid pipeline core (8) section, the section is contained by the tensioner (31) and its end is connected to the tug boat (41). The first rigid pipeline core (8) section is then pulled by the tug boat (41) towards the offshore launch ramp (38), making room for a next pipe to be welded to the core (8). The tug boat (41) pull is compensated by the tensioner (31) and thus, the rigid pipeline core (8) stands still, allowing the system to be built at the stations. At this moment, the section of the rigid pipe core (8) under construction just ahead of the tensioner (31) receives, in its structure, the internal parts of the riser guides (22), mounted in the riser guide internal parts assembly station (33). Then, the assembly of the rigid pipeline core continues (8) to the limit where its end reaches the offshore launch ramp (38). Then, the construction of the rigid pipeline core (8) is interrupted for the connection of the LRTA riser and flowline connection system (15). This system (15) is prefabricated, containing the guides (10B) internal parts (22) and the bending limiting structure (11), without the tubular closing members (20A), already assembled. The system (15) is positioned on the offshore launch ramp (38) by a crane (40) to then be connected to the rigid pipeline core (8).

Once the connection system between risers and flowlines (15) is connected to the rigid pipeline core (8), the composite risers (9), stored in coils (35), are connected to the structure (in the riser guide internal parts assembly station passing through the compartments (21) and by the guides (10B) of the connection system (15), so that they are properly positioned for connection with the flowlines (13). Then, the tubular closing members (20A) of the bending limiting structure (11) and outer parts (23) of the guides (10B) can be fastened using compression tapes (24). Once the connection is completed, the construction of the rigid pipeline core (8) is restarted.

Once the bundle construction is completed (3), it is transported along the offshore launching ramp (38) until it reaches full buoyancy.

The invention claimed is:

1. A connection system between composite material risers and flowlines forming a lower riser termination assembly (LRTA) (15), applicable to the hybrid riser system (1) made of composite material and comprised by a vertical section, named bundle (3), pulled by a float (4) at an upper end (6) of the bundle (3), wherein a connection between the float (4) to the upper end (6) of the bundle (3) is made by a tether (5) and the upper end (6) is provided with an anchoring point for composite risers (9), as well as a connection between flexible jumpers (7) and the bundle (3) of the composite risers (9), where the flexible jumpers (7) are connected to a stationary production unit (UEP) (2); the bundle (3) being comprised of a rigid pipeline core (8), by the composite risers (9) and by guides (10) for the composite risers (9), having, at a lower end of the bundle (3), the LRTA (15) characterized by being comprised of guides (10B) connected to the rigid pipeline core (8), by a bending limiting structure (11) of the composite risers (9), also connected to the rigid core pipeline (8), and by direct connection connectors (12) between the composite risers (9) and flowlines (13), where the limiting bending structure (11) is manufactured from tubular steel members (20) and (20A), forming compartments (21) through which the composite risers (9) pass for a proper connection position with the flowlines (13), wherein the directing guides (10B) of the composite risers (9) are comprised of internal parts (22) and outer parts (23), made of polymeric material, wherein internal parts (22) and outer parts (23), once joined, have a cylindrical shape being connected to the rigid core (8) by means of a compression tape (24) manufactured in Kevlar®, directing the composite risers (9) to the compartments (21) of the bending limiting structure (11).

2. The LRTA connection system (15), according to claim 1, characterized in that the tubular steel members are tubular pass-through members (20) and tubular closing members (20A), which comprise the bending limiting structure (11) forming the compartments (21); the tubular pass-through members (20) defining longitudinal spaces for the composite risers (9) to pass through and the tubular closing members (20A) establishing the bending limit curvature of the composite risers (9); the tubular closure members (20A) being connected to the pass-through pipe members (20) only after the composite risers (9) have passed through.

3. The LRTA connection system (15) according to claim 2, characterized in that the tubular closure members (20A) form a bend with a radius greater than a minimum bending radius ranging from 4 to 20 m; and an arch length of the bending limiting structure (11), which limits the bending of the composite risers (9), should correspond to an angle from 15 to 45 degrees.

4. The LRTA connection system (15) according to claim 1, characterized in that the direct connection connectors (12) have an alignment system between a connector part located on the composite risers (9) and a connector part located on the flowline (13), which allows an alignment at any position of a connecting axis, the alignment system being incorporated into the connector (12) parts and/or a recoverable tool.

5. A hybrid riser system (1) construction method with the connection system (15) as defined in claim 1, characterized by the following steps:
    a. arranging two 12 m pipes at a welding station (27) for the formation of a first section of the rigid pipeline core (8);
    b. arranging the first section of the rigid pipeline core (8), after welding of the first section of the rigid pipeline core (8), at a welding inspection station (28) and, after the welding is inspected, arranging the welded section in a welding repair station (29) for any repairs;
    c. arranging the first rigid pipeline core section (8) at a welding joint lining station (30) to line the welding;
    d. connecting an end of a tensioner (31) to a tugboat (41), which after welding (27), inspection (28), possible repairs (29) and joint lining (30), contains the first section of the rigid pipe core (8);
    e. displacing the first rigid pipeline core section (8) towards an offshore launch ramp (38) with the aid of the tugboat (41) until there is room for a next 12 m pipe making part of the rigid pipeline core (8), to be inserted into the welding station (27);
    f. receiving, in the structure of the rigid pipeline core section (8) under construction moved to a position just in front of the tensioner (31), internal parts (22) of riser guides (10B), assembled in a riser guide internal parts assembly station (33);
    g. arranging, simultaneously to the step "f", the next pipe, which was inserted in the process to make up the rigid pipeline core (8) in the welding station (27), and repeating steps "b" "c", "d", "e" and "f", and so on and on;
    h. stopping the rigid pipeline core (8) construction, by the time the rigid pipeline core length (8) under construction reaches the offshore launch ramp (38), for assembly of the LRTA connection system (15), the system (15) being prefabricated, consisting of the internal parts (22) of the guides (10B) and a bending limiting structure (11) without tubular closing members (20A); the LRTA system (15) being positioned on the offshore launching ramp (38) by a crane (40) to then be connected to the rigid pipeline core (8) by welding;
    i. restarting the construction of the rigid pipeline core (8) by inserting an additional 12 m of pipe into the welding station (27) and repeating steps "b", "c", "d", "e" and "f", once the LRTA connection system (15) is assembled;
    j. connecting, in parallel to step "i" and complying with design assumptions, the composite risers (9) stored in coils (35) to the structure under construction, passing through the internal parts (22) of the guides (10) and (10B) and compartments (21) of the bending limiting structure (11), in order to be properly positioned for connection to the flowlines (13);
    k. assembling the tubular closing members (20A) of the bending limiting structure (11) next to pass-through tubular members (20) and to outer parts (23) of the guides (10) and (10B);
    l. continuing to position the composite risers (9) along the structure as the rigid pipeline core (8) is assembled and the internal parts (22) of the riser guides are installed, at the riser guide internal parts assembly station (33), and subsequently installing the outer part of the riser guides (23) at a riser guide outer parts assembly station (37); and,
    m. transporting the bundle (3), now complete, by the offshore launch ramp (38) until the bundle (3) reaches full buoyancy.

6. A connection system between composite material risers and flowlines forming a lower riser termination assembly (LRTA) (15), applicable to the hybrid riser system (1) made of composite material and comprised by a vertical section, named bundle (3), pulled by a float (4) at an upper end (6) of the bundle (3), wherein a connection between the float (4) to the upper end (6) of the bundle (3) is made by a tether (5) and the upper end (6) is provided with an anchoring point for composite risers (9), as well as a connection between flexible jumpers (7) and the bundle (3) of the composite risers (9), where the flexible jumpers (7) are connected to a stationary production unit (UEP) (2); the bundle (3) being comprised of a rigid pipeline core (8), by the composite risers (9) and by guides (10) for the composite risers (9), having, at a lower end of the bundle (3), the LRTA (15) characterized by being comprised of guides (10B) connected to the rigid pipeline core (8), by a bending limiting structure (11) of the composite risers (9), also connected to the rigid core pipeline (8), and by direct connection connectors (12) between the composite risers (9) and flowlines (13), where the limiting bending structure (11) is manufactured from tubular steel members (20) and (20A), forming compartments (21) through which the composite risers (9) pass for a proper connection position with the flowlines (13), wherein the tubular steel members are tubular pass-through members (20) and tubular closing members (20A), which comprise the bending limiting structure (11) forming the compartments (21); the tubular pass-through members (20) defining longitudinal spaces for the composite risers (9) to pass through and the tubular closing members (20A) establishing the bending limit curvature of the composite risers (9); the tubular closure members (20A) being connected to the pass-through pipe members (20) only after the composite risers (9) have passed through.

7. The LRTA connection system (15) according to claim 6, characterized by the fact in that the tubular closure members (20A) form a bend with a radius of which should be greater than a minimum bending radius informed by the riser (9) pipe manufacturer ranging from 4 to 20 m; and an arch length of the bending limiting structure (11), which limits the bending of the riser (9), bending should correspond to an angle from 15 to 45 degrees.

8. A connection system between composite material risers and flowlines forming a lower riser termination assembly (LRTA) (15), applicable to the hybrid riser system (1) made of composite material and comprised by a vertical section, named bundle (3), pulled by a float (4) at an upper end (6) of the bundle (3), wherein a connection between the float (4) to the upper end (6) of the bundle (3) is made by a tether (5) and the upper end (6) is provided with an anchoring point for composite risers (9), as well as a connection between flexible jumpers (7) and the bundle (3) of the composite risers (9), where the flexible jumpers (7) are connected to a stationary production unit (UEP) (2); the bundle (3) being comprised of a rigid pipeline core (8), by the composite risers (9) and by guides (10) for the composite risers (9), having, at a lower end of the bundle (3), the LRTA (15) characterized by being comprised of guides (10B) connected to the rigid pipeline core (8), by a bending limiting structure (11) of the composite risers (9), also connected to the rigid core pipeline (8), and by direct connection connectors (12) between the composite risers (9) and flowlines (13), where the limiting bending structure (11) is manufactured from tubular steel members (20) and (20A), forming compartments (21) through which the composite risers (9) pass for a proper connection position with the flowlines (13), wherein the direct connection connectors (12) have an alignment system between a connector part located on the composite risers (9) and a connector part located on a flowline (13), which allows an alignment at any position of a connecting axis, the alignment system being incorporated into the connector (12) parts and/or a recoverable tool.

\* \* \* \* \*